US008989195B2

(12) United States Patent
Ye

(10) Patent No.: US 8,989,195 B2
(45) Date of Patent: Mar. 24, 2015

(54) PROTECTION SWITCHING IN MULTIPROTOCOL LABEL SWITCHING (MPLS) NETWORKS

(75) Inventor: Jinrong Ye, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 142 days.

(21) Appl. No.: 13/464,229

(22) Filed: May 4, 2012

(65) Prior Publication Data

US 2012/0281705 A1 Nov. 8, 2012

(30) Foreign Application Priority Data

May 6, 2011 (CN) .......................... 2011 1 0117304

(51) Int. Cl.
*H04L 12/723* (2013.01)
*H04L 12/703* (2013.01)
*H04L 12/437* (2006.01)

(52) U.S. Cl.
CPC ............... *H04L 45/50* (2013.01); *H04L 45/28* (2013.01); *H04L 12/437* (2013.01)
USPC ...................................................... 370/395.5

(58) Field of Classification Search
CPC ........ H04L 45/28; H04L 45/50; H04L 12/437
USPC ......... 370/216–225, 229–230, 389, 392, 474, 370/475
See application file for complete search history.

(56) References Cited

U.S. PATENT DOCUMENTS

| 7,339,887 B2 * | 3/2008 | Griswold et al. ............. 370/216 |
| 2003/0043792 A1 * | 3/2003 | Carpini et al. ................ 370/386 |
| 2003/0081589 A1 * | 5/2003 | Marian et al. ................. 370/351 |
| 2003/0108029 A1 * | 6/2003 | Behzadi ........................ 370/351 |
| 2004/0062197 A1 * | 4/2004 | Klink ............................ 370/222 |
| 2005/0097219 A1 * | 5/2005 | Goguen et al. ................ 709/238 |
| 2005/0201273 A1 * | 9/2005 | Shimizu ........................ 370/216 |
| 2007/0159961 A1 * | 7/2007 | Zhai ............................. 370/217 |
| 2007/0274207 A1 * | 11/2007 | Li ................................. 370/222 |
| 2007/0280251 A1 * | 12/2007 | Wang et al. ................ 370/395.1 |
| 2008/0170496 A1 * | 7/2008 | Kano ............................ 370/225 |
| 2008/0304407 A1 * | 12/2008 | Umansky et al. ............ 370/222 |

(Continued)

FOREIGN PATENT DOCUMENTS

| CN | 101146115 | 3/2008 |
| CN | 101159690 | 4/2008 |

(Continued)

OTHER PUBLICATIONS

CN First Office Action dated Jul. 3, 2013 issued on CN Patent Application No. 201110117304.2 dated May 6, 2011, The State Intellectual Property Office, P.R. China.

*Primary Examiner* — Paul H Masur
*Assistant Examiner* — Kabir Jahangir
(74) *Attorney, Agent, or Firm* — Mannava & Kang, P.C.

(57) ABSTRACT

Protection switching in a multi-protocol label switching (MPLS) ring network with a protection label switch path that is shared by multiple working label switch paths may include receiving a packet intended for transmission towards a disconnected adjacent node on a working label switch path, and adding, to the received packet, a protection label and a merge label. The merge label may uniquely identify the working label switch path on which the packet is received. The packet may be transmitted on the protection label switch path.

17 Claims, 10 Drawing Sheets

(56) References Cited

U.S. PATENT DOCUMENTS

| | | | |
|---|---|---|---|
| 2009/0040922 A1* | 2/2009 | Umansky et al. | 370/224 |
| 2009/0238084 A1* | 9/2009 | Nadeau et al. | 370/248 |
| 2010/0188970 A1* | 7/2010 | Fujii et al. | 370/222 |
| 2010/0189115 A1* | 7/2010 | Kitada | 370/400 |
| 2011/0205885 A1* | 8/2011 | Kini et al. | 370/217 |

FOREIGN PATENT DOCUMENTS

| | | |
|---|---|---|
| EP | 1130852 | 2/2000 |
| EP | 1793530 | 6/2007 |

* cited by examiner

PROTECTION SWITCHING IN MULTIPROTOCOL LABEL SWITCHING (MPLS) NETWORKS

CLAIM FOR PRIORITY

The present application claims priority under 35 U.S.C 119 (a)-(d) to Chinese Patent application number 201110117304.2, filed on May 6, 2011, which is incorporated by reference in its entirety.

BACKGROUND

Multiprotocol label switching (MPLS) is a label switching protocol designed to transport data packets from a source node to a destination node based on short, fixed-length path labels. Since nodes in the network are not required to perform complex network address lookup and route calculation, label switching allows data packets to be transported more efficiently through the network. The path along which the packets are transmitted on the network is known as a label switch path (LSP), which is a connection-oriented path over a connectionless Internet Protocol (IP) network.

BRIEF DESCRIPTION OF DRAWINGS

By way of non-limiting examples, protection switching will be described with reference to the following drawings, in which.

DETAILED DESCRIPTION

Figure 1:
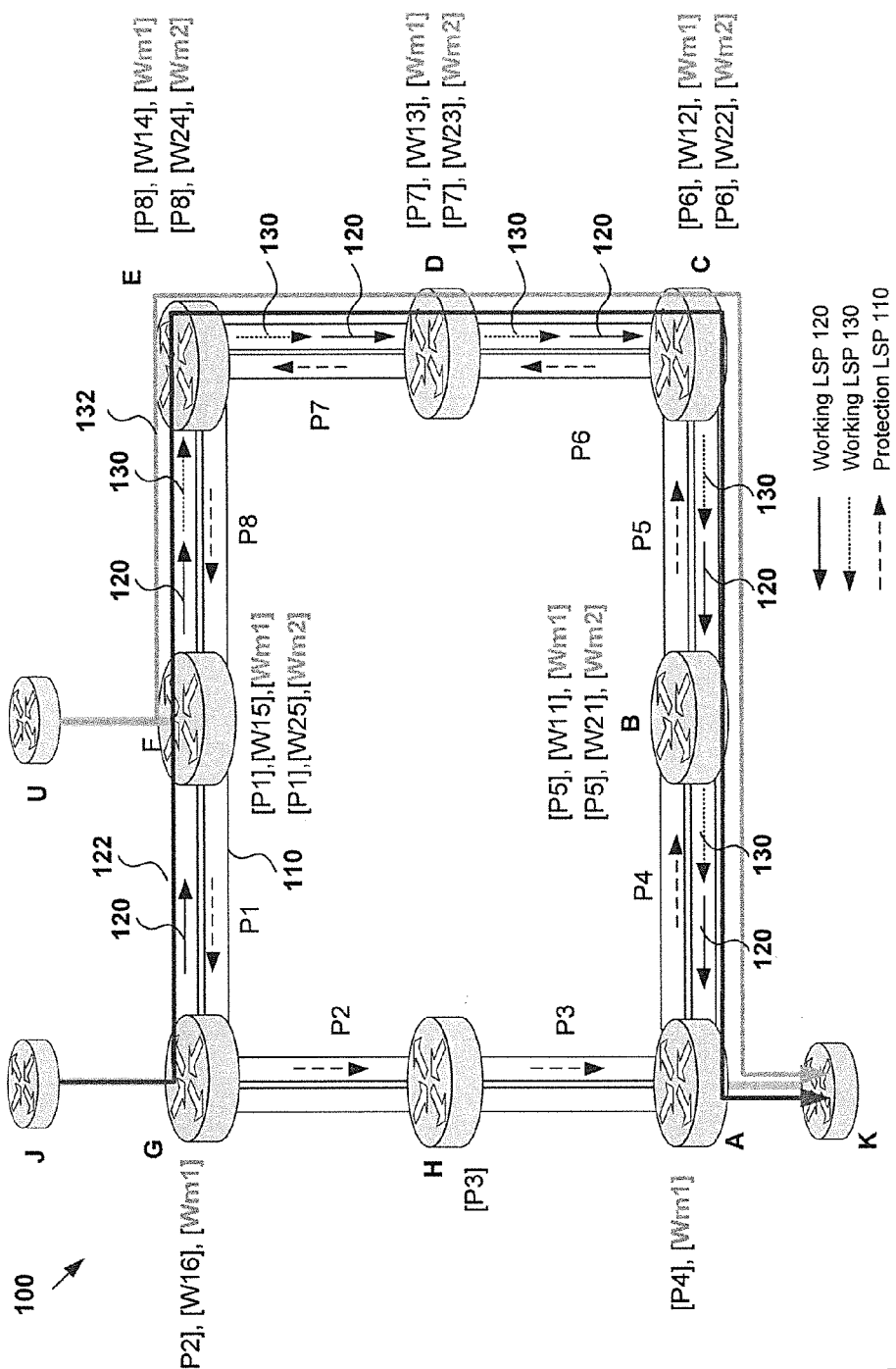
FIG. 1 is a schematic diagram of an example MPLS network in which protection switching is performed.

FIG. 1 shows an example multiprotocol label switching (MPLS) network 100 with a ring topology. The network 100 may use any MPLS-based protocols, such as MPLS transport profile (MPLS-TP) that enhances existing MPLS standards to include support for transport operational modules, such as Operations, Administration and Maintenance (OAM) protection mechanism.

In the example in FIG. 1, the ring network 100 is formed by multiple network devices in the form of nodes A, B, C, D, E, F, G and H. Each node may be connected to other devices outside of the ring network, such as devices J, K and U which are connected to nodes G, A and F respectively. A network device may be router, bridge, switch or host etc.

The network 100 is configured with a fully closed protection label switch path (LSP) 110 shared by multiple working LSPs 120, 130. A working LSP 120, 130 may be established between any network devices in the ring network 100 to, for example, facilitate a service connection etc. In the example in FIG. 1, service connection 122 is established to forward packets from device J to device K; and service connection 132 to forward packets from device U to device K.

Two corresponding working LSPs 120, 130 are established for the service connections 122, 132:

(i) working LSP 120 between nodes G and A, in which case G serves as an ingress node; nodes F, E, D, C and B are transit nodes; and A serves as an egress node for service connection 122; and (ii) working LSP 130 between nodes F and A, in which case F serves as an ingress node; nodes E, D, C and B are transit nodes; and A serves as an egress node for service connection 132.

The protection LSP 110 enables protection switching in the network 100 to allow recovery from a link or node failure on a working LSP 120, 130 while minimising disruption to traffic. For example, link or node failure may be caused by degradation in the quality of service, network congestion, and physical damage to the link etc.

Packets are generally transmitted on the working LSPs 120, 130, but when a link or node failure is detected, packets are 'switched' to travel in an opposite direction on the protection LSP 110 and therefore away from the failure. In the example in FIG. 1, packets are transmitted clockwise on the working LSPs 120, 130 and anticlockwise on the protection LSP 110. Of course, in another implementation, the direction of the working 120, 130 and protection 110 LSPs may be reversed. A node is 'downstream' of another node device if the former receives packets forwarded by the latter. For example, network device E is downstream to network device F on the clockwise working LSP 120, 130 whereas network device D is downstream to network device F on the anticlockwise protection LSP 110.

In the MPLS network 100, packets are forwarded in the network 100 based on labels. The process of placing labels on a packet is known as label stacking, and packets need only be routed based on the topmost label in its label stack. As will be explained in further detail below, each node is assigned a working label and a protection label to facilitate packet transmission on the working LSP 120, 130 and the protection LSP 110.

To facilitate sharing of the protection LSP 110 by multiple working LSPs during protection switching, each working LSP 120, 130 is assigned a merge label. The merge label uniquely identifies a particular working LSP 120, 130 in the network 100 and is known to nodes on the working LSP 120, 130. The example protection switching method explained below may be used for both link and node failure protection. The merge label is known to nodes on the particular working LSP 120, 130.

Label Assignment

Figure 2:
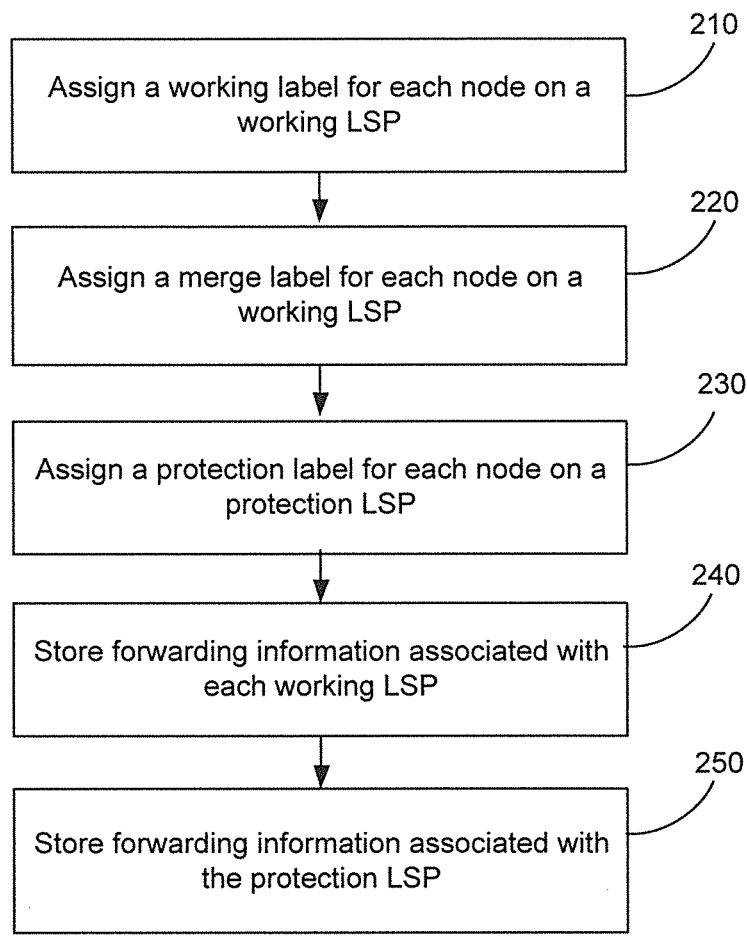
FIG. 2 is a flowchart of an example method for assigning labels and storing forwarding information.

Referring also to FIG. 2, an example method for assigning labels to nodes in the network 100 will now be explained.

At block 210, each node on a working LSP 120, 130 is assigned a working label. The nodes on the same working LSP 120, 130 may have different working labels (see also FIG. 7 and FIG. 8) or share the same working label (see also FIG. 9).

In the example network 100 in FIG. 1, the following working labels are assigned to the nodes on working LSP 120: [W16] to ingress node G; [W15] to transit node F; [W14] to transit node E; [W13] to transit node D; [W12] to transit node C; and [W11] to transit node B.

Different working labels, however, are assigned to different working LSPs. In the example in FIG. 1, the following working labels are assigned to the nodes on working LSP 130: [W25] to ingress node F; [W24] to transit node E; [W23] to transit node D; [W22] to transit node C; and [W21] to transit node B.

An egress node of a working LSP (node A in the above examples) does not require a working label because a packet exits the working LSP 120, 130 via the egress node.

At block 220, each node is assigned a merge label that uniquely identifies a particular working LSP 120, 130. In the example in FIG. 1, merge label [Wm1] is assigned to working LSP 120, and merge label [Wm2] to working LSP 130. In other words, different merge labels are assigned to different working LSPs 120, 130 in the network 100.

Each merge label is known to nodes on the particular working LSP 120, 130 identified by the merge label. For example, [Wm1] is known to nodes G, F, E, D, C, B and A on working LSP 120 while [Wm2] is known to nodes F, E, D, C, B and A on working LSP 130. The merge labels may be assigned by a network controller, or one of the nodes.

The merge label may be the same as or different to the working labels of a particular working LSP. In the example in FIG. 1, the merge labels [Wm1], [Wm2] are different to the working labels assigned to the respective working LSP 120 ([W16] to [W11]) and working LSP 130 ([W25] to [W21]). In another example shown in FIG. 9, the same working label [W1] is assigned to all nodes on a particular working LSP 140, in which case the working label may be used as a merge label.

At block 230, each node on the protection LSP 110 is assigned a protection label. In the example in FIG. 1, the following protection labels are assigned to nodes A to H: [P1] to node F; [P2] to node G; [P3] to node H; [P4] to node A; [P5] to node B; [P6] to node C; [P7] to node D; and [P8] to node E.

The protection labels may be assigned by a network controller, or one of the nodes. Each node on the protection LSP 110 may have different protection labels like in the example in FIG. 1, or have the same protection label, [P1] for example. The protection label of a node is different to its working label or merge label.

Forwarding Information

To facilitate packet forwarding within the network 100, each node stores forwarding information to help it determine how a packet should be forwarded and any necessary label operation on the packet.

In one implementation, the forwarding information may be stored in the form of forwarding table entries. A forwarding entry may be a next hop label forwarding entry (NHFLE), which generally includes information on a next hop of a packet and a label operation on a label stack of the packet. A label operation may be one of the following:
  a 'swap' operation where a topmost label ("incoming label") on a label stack of the packet is replaced with a new label ("outgoing label");
  a 'pop' operation where the topmost label ("incoming label") on a label stack of the packet is removed to reveal an inner label on the label stack; or
  a 'push' operation where a new label ("outgoing label") is added or pushed onto the topmost label ("incoming label") on a label stack of the packet.

An incoming label map (ILM) may be used to map each incoming label to an outgoing label. A forwarding equivalence class (FEC) to NHFLE (FTN) map maps each FEC to an NHFLE. In an MPLS network 100, packets with the same features, such as destination or service level etc., are classified as one class or FEC. Packets belong to the same FEC receive the same treatment in the network 100.

Figure 3:
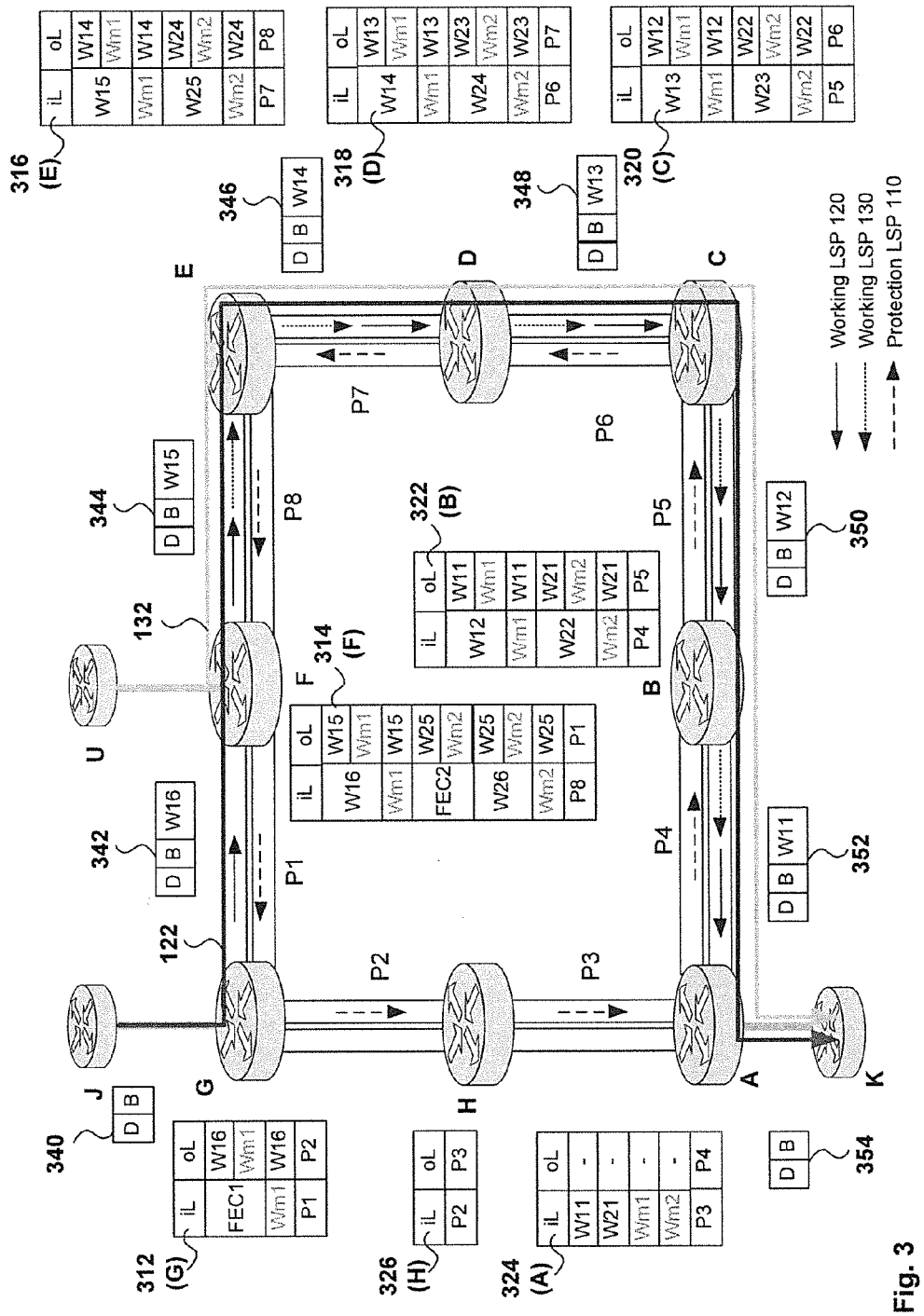
FIG. 3 is a schematic diagram of the example MPLS network in FIG. 1 with corresponding forwarding information.

Referring to FIG. 2 and FIG. 3, an example method for storing forwarding information at each node in the network 100 is explained. The forwarding information is generally stored locally at each node.

At block 240, forwarding information associated with each working LSP 120, 130 is stored at each node on the respective working LSP 120, 130.

At an ingress node, the following forwarding information is stored:
  (a) a forwarding entry (FECu→Wy) that maps an FEC of a packet (FECu) to a working label (Wy) of the ingress node and a push operation; and
  (b) a forwarding entry (FECu→Wm) that maps an FEC of a packet (FECu) to a merge label (Wm) and a push operation.

FECu represents an FEC of a packet sent by a node outside of the ring, such as devices J and K in service connections 122 and 132 respectively; Wy represents a working label of the ingress node on a working LSP, and Wm represents a merge label of the working LSP.

At a transit node, the following forwarding information is stored:
  (a) a forwarding entry (Wx→Wy) that maps a working label (Wx) of an adjacent node upstream from the transit node on a working LSP 120, 130 with a working label (Wy) of the transit node and a swap operation;
  (b) a forwarding entry (Wx→Wm) that maps a working label (Wx) of an adjacent node upstream from the transit node on a working LSP 120, 130 with a merge label (Wm) identifying the working LSP 120, 130 and a swap operation; and
  (c) a forwarding entry (Wm→Wy) that maps a merge label (Wm) of a working LSP 120, 130 to a working label (Wy) of the transit node when traffic is switched from the protection LSP to a working LSP.

At an egress node, the following forwarding information is stored:
  (a) a forwarding entry (Ww) that maps a working label (Ww) of a node upstream from the egress node on a working LSP to a pop label operation; and
  (b) a forwarding entry (Ww→Wm) that maps an incoming working label (Ww) of a node upstream from the egress node on a working LSP to an outgoing merge label (Wm) and a swap operation.

Forwarding information associated with a merge label facilitate protection switching in the event of link or node failure. Note that if the working labels of all nodes on a particular working LSP are the same, and they are the same as the merge label, it is not necessary to store forwarding information associated for both the merge and working labels.

At block 250, forwarding information associated with the protection LSP is stored at each node on the protection LSP 110. In particular, at each node, the following forwarding information is stored:
  forwarding entry (Px→Py) that maps an incoming protection label (Px) of an adjacent node upstream from the current node on the protection LSP 110 to an outgoing protection label of the current node (Py), and a swap operation.

Using working LSP 120 in FIG. 3 as an example, the following forwarding information is stored at the ingress node G, transit nodes F, E, D, C, and B and egress node A:

At ingress node G (see 312 in FIG. 3):
  (a) FEC1→[W16], which maps an incoming packet with FEC information FEC1 to working label [W16] and a push label operation;

(b) FEC1→[Wm1], which maps FEC information FEC1 to merge label [Wm1] and a push operation; and
(c) [Wm1]→[W16], which maps merge label [Wm1] to working label [W16] and a swap operation.

At transit node F (see 314 in FIG. 3):
(a) [W16]→[W15], which maps a packet with incoming working label [W16] to an outgoing working label [W15] and a swap label operation;
(b) [W16]→[Wm1], which maps a packet with incoming working label [W16] to an outgoing merge label [Wm1] and a swap label operation; and
(c) [Wm1]→[W15], which maps merge label [Wm1] to working label [W15] and a swap operation.

At transit node E (see 316 in FIG. 3):
(a) [W15]→[W14], which maps a packet with incoming working label [W15] to an outgoing working label [W14] and a swap label operation;
(b) [W15]→[Wm1], which maps a packet with incoming working label [W15] to an outgoing merge label [Wm1] and a swap label operation; and
(c) [Wm1]→[W14], which maps merge label [Wm1] to working label [W14] and a swap operation.

At transit node D (see 318 in FIG. 3):
(a) [W14]→[W13], which maps a packet with incoming working label [W14] to an outgoing working label [W13] and a swap label operation;
(b) [W14]→[Wm1], which maps a packet with incoming working label [W14] to an outgoing merge label [Wm1] and a swap label operation; and
(c) [Wm1]→[W13], which maps merge label [Wm1] to working label [W13] and a swap operation.

At transit node C (see 320 in FIG. 3):
(a) [W13]→[W12], which maps a packet with incoming working label [W13] to an outgoing working label [W12] and a swap label operation;
(b) [W13]→[Wm1], which maps a packet with incoming working label [W13] to an outgoing merge label [Wm1] and a swap label operation during protection switching; and
(c) [Wm1]→[W12], which maps merge label [Wm1] to working label [W12] and a swap operation.

At transit node B (see 322 in FIG. 3):
(a) [W12]→[W11], which maps a packet with incoming working label [W12] to an outgoing working label [W11] and a swap label operation;
(b) [W12]→[Wm1], which maps a packet with incoming working label [W12] to an outgoing merge label [Wm1] and a swap label operation during protection switching; and
(c) [Wm1]→[W11], which maps merge label [Wm1] to working label [W11] and a swap operation.

At egress node A (324 in FIG. 3):
(a) [W11], which maps an incoming working label [W11] to a pop operation; and
(b) [Wm1], which maps merge label [Wm1] to a pop operation.

Using working LSP 130 in FIG. 3 as another example, the following forwarding information is stored at the ingress node F, transit nodes E, D, C, and B and egress node A:

At ingress node F (see 314 in FIG. 3):
(a) FEC2→[W25], which maps an incoming packet with FEC information FEC2 to working label [W25] and a push operation;
(b) FEC2→[Wm2], which maps FEC information FEC2 to merge label [Wm2] and a push operation; and
(c) [Wm2]→[W25], which maps merge label [Wm2] to working label [W25] and a swap operation At transit node E (see 316 in FIG. 3):
(a) [W25]→[W24], which maps a packet with incoming working label [W25] to an outgoing working label [W24] and a swap label operation;
(b) [W25]→[Wm2], which maps a packet with incoming working label [W25] to an outgoing merge label [Wm2] and a swap label operation during protection switching; and
(c) [Wm2]→[W24], which maps merge label [Wm2] to working label [W24] and a swap operation.

At transit node D (see 318 in FIG. 3):
(a) [W24]→[W23], which maps a packet with incoming working label [W24] to an outgoing working label [W23] and a swap label operation;
(b) [W24]→[Wm2], which maps a packet with incoming working label [W24] to an outgoing merge label [Wm2] and a swap label operation during protection switching; and
(c) [Wm2]→[W23], which maps merge label [Wm2] to working label [W23] and a swap operation.

At transit node C (see 320 in FIG. 3):
(a) [W23]→[W22], which maps a packet with incoming working label [W23] to an outgoing working label [W22] and a swap label operation;
(b) [W23]→[Wm2], which maps a packet with incoming working label [W23] to an outgoing merge label [Wm2] and a swap label operation during protection switching; and
(c) [Wm2]→[W22], which maps merge label [Wm2] to working label [W22] and a swap operation.

At transit node B (see 322 in FIG. 3):
(a) [W22]→[W21], which maps a packet with incoming working label [W22] to an outgoing working label [W21] and a swap label operation;
(b) [W22]→[Wm2], which maps a packet with incoming working label [W22] to an outgoing merge label [Wm2] and a swap label operation during protection switching; and
(c) [Wm2]→[W21], which maps merge label [Wm2] to working label [W21] and a swap operation.

At egress node A (see 324 in FIG. 3):
(a) [W21], which maps an incoming working label [W21] to pop operation; and
(b) [Wm2], which maps merge label [Wm2] to a pop operation.

The following forwarding information associated with protection switching is also stored on nodes A to H, as detailed below:
At node G (see 312 in FIG. 3): [P1]→[P2] and swap operation;
At node H (see 314 in FIG. 3): [P2]→[P3] and swap operation;
At node A (see 316 in FIG. 3): [P3]→[P4] and swap operation;
At node B (see 318 in FIG. 3): [P4]→[P5] and swap operation;
At node C (see 320 in FIG. 3): [P5]→[P6] and swap operation;
At node D (see 322 in FIG. 3): [P6]→[P7] and swap operation;
At node E (see 324 in FIG. 3): [P7]→[P8] and swap operation; and
At node F (see 326 in FIG. 3): [P8]→[P1] and swap operation.

Packet Forwarding on a Working LSP

Figure 4:
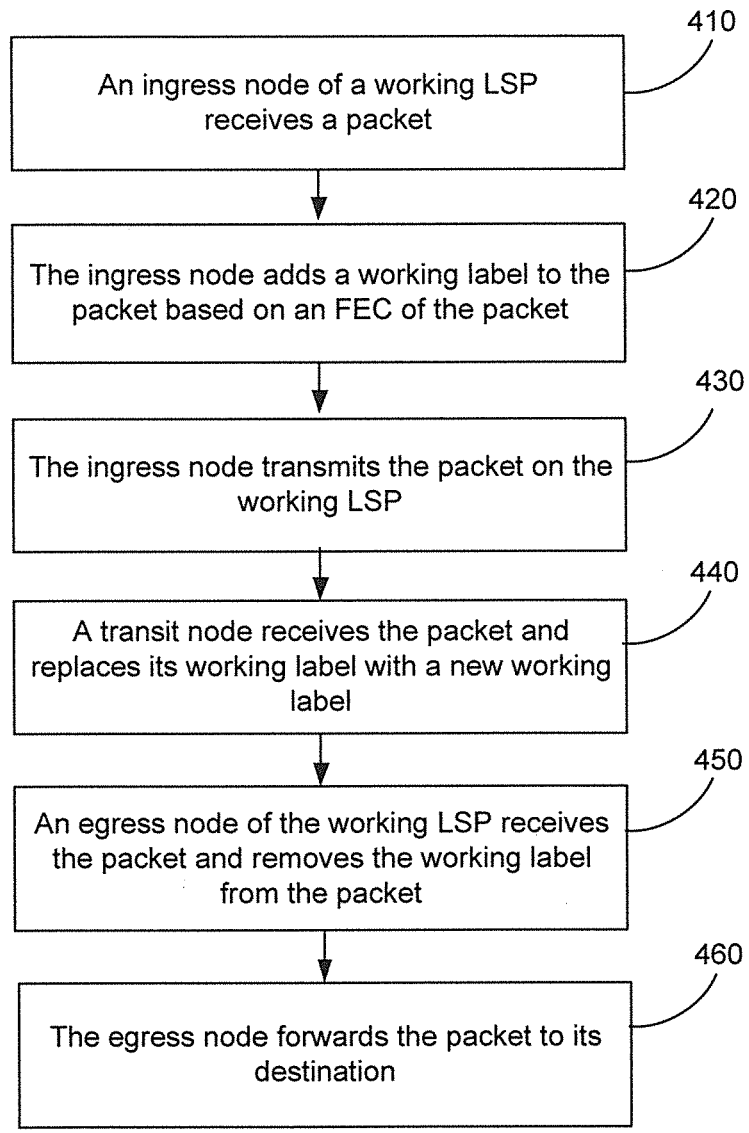
FIG. 4 is a flowchart of an example method for packet forwarding on a working label switch path.

An example process for packet forwarding on a working LSP 120, 130 will now be explained with reference to FIG. 4.

At block 410, an ingress node on a working LSP 120, 130 receives a packet from a source node outside of the ring 100.

At block 420, the ingress node determines an FEC of the packet, and then searches for forwarding information (FECu→Wy) that associates the FEC with a working label (Wy) and a push operation. The ingress node performs the push operation to add the working label to the message.

At block 430, the ingress node forwards the packet on the working LSP 120, 130 to a downstream node.

At block 440, a transit node on the working LSP 120, 130 receives the packet, and searches for forwarding information that associates a working label on the packet (incoming label Wx) with a new working label (outgoing label Wy). The transit node then carries out a swap operation to replace the incoming label with the outgoing label, after which the packet is forwarded to a downstream node on the working LSP 120, 130.

At block 450, an egress node on the working LSP 120, 130 receives the packet, and searches for forwarding information that associates the working label on the packet (incoming label Ww) with a pop operation. The ingress node then proceeds to remove the working label from the packet.

At block 460, the egress node forwards the packet to its destination, which may be the egress node itself or a node outside of the ring 100.

Using working LSP 120 in FIG. 3 as an example, the process for forwarding packets in a clockwise direction from ingress node G to egress node A is as follows:

At ingress node G:
Upon receiving a packet 340 from source device J, ingress node G searches for forwarding information 312 associated with the FEC information (FEC1) on the packet 320. According to forwarding information FEC1→[W16], node G pushes working label [W16] onto the packet 342 and forwards it to downstream node F on working LSP 120.

At transit node F:
Transit node F searches for forwarding information 314 based on working label [W16] on the packet 342. According to entry [W16]→[W15], transit node F swaps working label [W16] with new label [W15] and forwards the packet 344 to downstream node E on the working LSP.

At transit nodes E, D, C and B:
Similar swap operations are performed at transit nodes E, D, C and B, in which case the working label is changed from [W15] to [W14] at node E, to [W13] at node D, to [W12] at node C, and finally to [W11] at node B. See forwarding information 316, 318, 320, 322 and outgoing packets 346, 348, 350, 352 in FIG. 3.

At egress node A:
Upon receiving the packet 352 from transit node B, egress node A searches for a forwarding information 324 based on working label [W11], and removes the working label [W11] from the packet 352. Egress node A then forwards the packet 354 to destination device K, which is outside of the ring.

Packets (not shown in FIG. 3) may be forwarded on working LSP 130 in a similar manner using forwarding information stored at ingress node F, transit nodes E to B and egress node A.

Packet Forwarding on a Protection LSP

In the event of a link or node failure on a working LSP 120, 130, packets are transmitted on the protection LSP 110 in an opposite direction and therefore away from the failure. An example method of protection switching will now be explained with reference to FIG. 5 and FIG. 6.

At block 510, the first node detects that it is disconnected from an adjacent node downstream to the first node on a working LSP 120, 130. The disconnection may be due to the failure of the adjacent node, or a failure of a link between the first node and the adjacent node.

The first node then activates protection switching such that any packets that arrived on the working LSP 120, 130 and intended for the disconnected adjacent node are redirected to the protection LSP 110. The first node also blocks any packet received on the protection LSP from the downstream node, such as by discarding the packets until the first node is connected to the adjacent node again.

At block 520, the second node also detects that it is disconnected from an adjacent node upstream from the second node on a working LSP 120, 130. Again, the disconnection may be due to the failure of the adjacent node, or a failure of a link between the first node and the adjacent node.

The second node updates its local forwarding information such that any packets received on the protection LSP 110 is redirected onto the working LSP 120, 130. More specifically, a label operation associated with an incoming protection label is updated from 'swap' to 'pop' to remove the protection label of an incoming packet arriving on the protection LSP 110. This ensures the packet is not forwarded to the disconnected adjacent node on the protection LSP 110, and the direction of the packet transmission is changed from the protection LSP 110 to the working LSP 120, 130.

At block 530, the first node receives a packet that is intended for transmission towards the disconnected adjacent node on the working LSP 120, 130.

At block 540, the first node adds a protection label and a merge label. The merge label uniquely identifies the working LSP 120, 130 on which the packet is received and known to the nodes on the working LSP 120, 130 identified by the merge label. More specifically, if the first node is also an egress node, the first node:
analyses a header of the packet to determine its FEC,
determines the merge label from forwarding information (FEC→Wm) that associates the FEC with the merge label Wm and a push operation, and
performs a push operation to add the merge label to the packet.

If the first node is a transit node, the first node:
determines the working label (Wx) of the received packet,
determines the merge label (Wm) from forwarding information (Wx→Wm) that associates the working label (Wx) with the merge label (Wm) and a swap operation; and
performs a swap operation to replace the working label (Wx) with the merge label (Wm).

At block 550, the first node transmits the packet to a downstream node on the protection LSP 110, which operates in a direction opposite to that of the working LSP and therefore away from the failure on the working LSP 120, 130.

At block 560, one or more nodes on the protection LSP 110 receive the packet, perform a swap operation on the incoming protection label of the packet according to stored forwarding information and forward the packet to a downstream node on the protection LSP 110.

Figure 6:
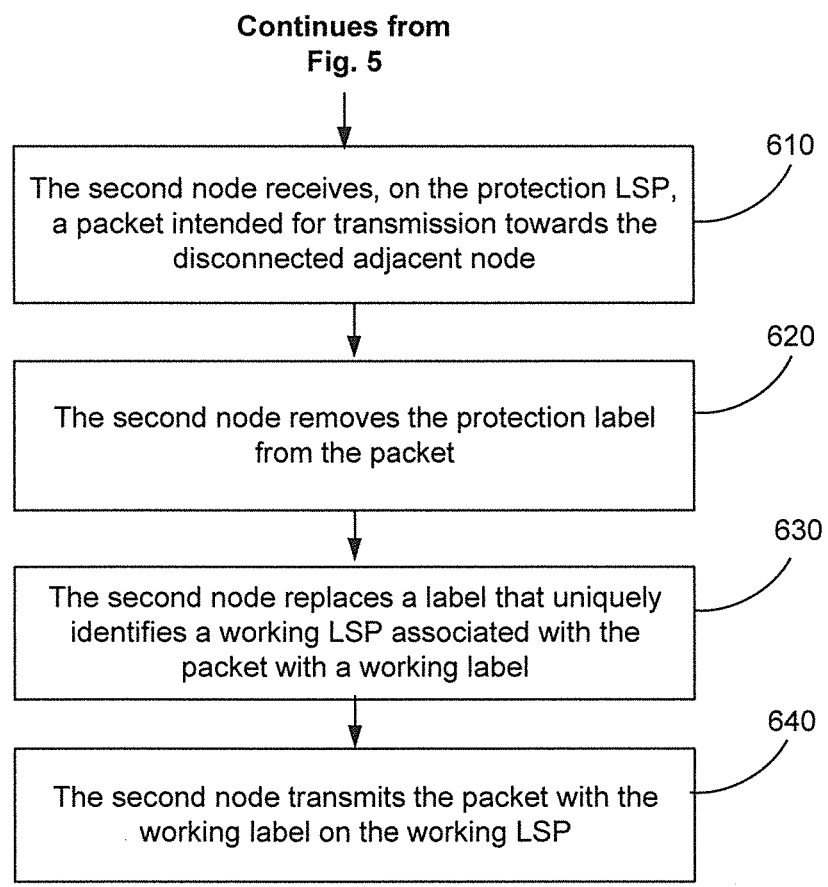
FIG. 6 is a continuation of the flowchart in FIG. 5.

At block 610 in FIG. 6, the second node receives, on the protection LSP 110, the packet with the merge label and protection label.

At block 620, the second node removes the protection label from the packet. More specifically, the second node searches for forwarding information associated with the protection label on the packet, and based on the pop operation updated at block 520 in FIG. 5, removes the protection label from the packet to reveal the inner merge label.

At block 630, the second node replaces the merge label with a working label. In particular, the second node searches for forwarding information associated with the merge label, and based on the swap operation associated with the merge label, replaces the merge label with the working label.

At block 640 in FIG. 6, the second node transmits the packet with the working label on the working LSP 120, 130.

Using the above process, the packets are 'wrapped' around a failed link or node during protection switching. Since the failure is detected locally at the first and second nodes, the example method described with reference to FIG. 5 and FIG. 6 facilitates recovery within a desired 50 ms.

Examples

Figure 5:
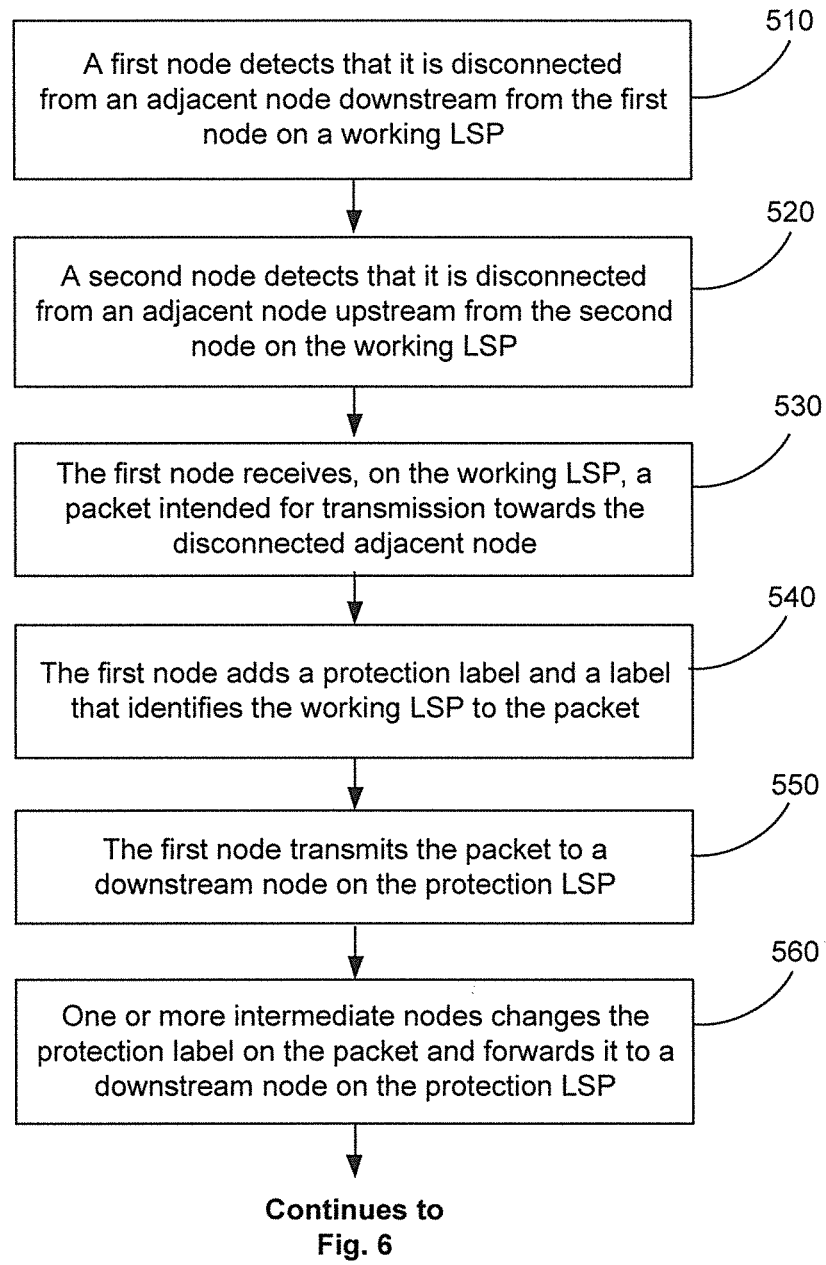
FIG. 5 is a flowchart of an example method for packet forwarding on a protection label switch path.
Figure 7:
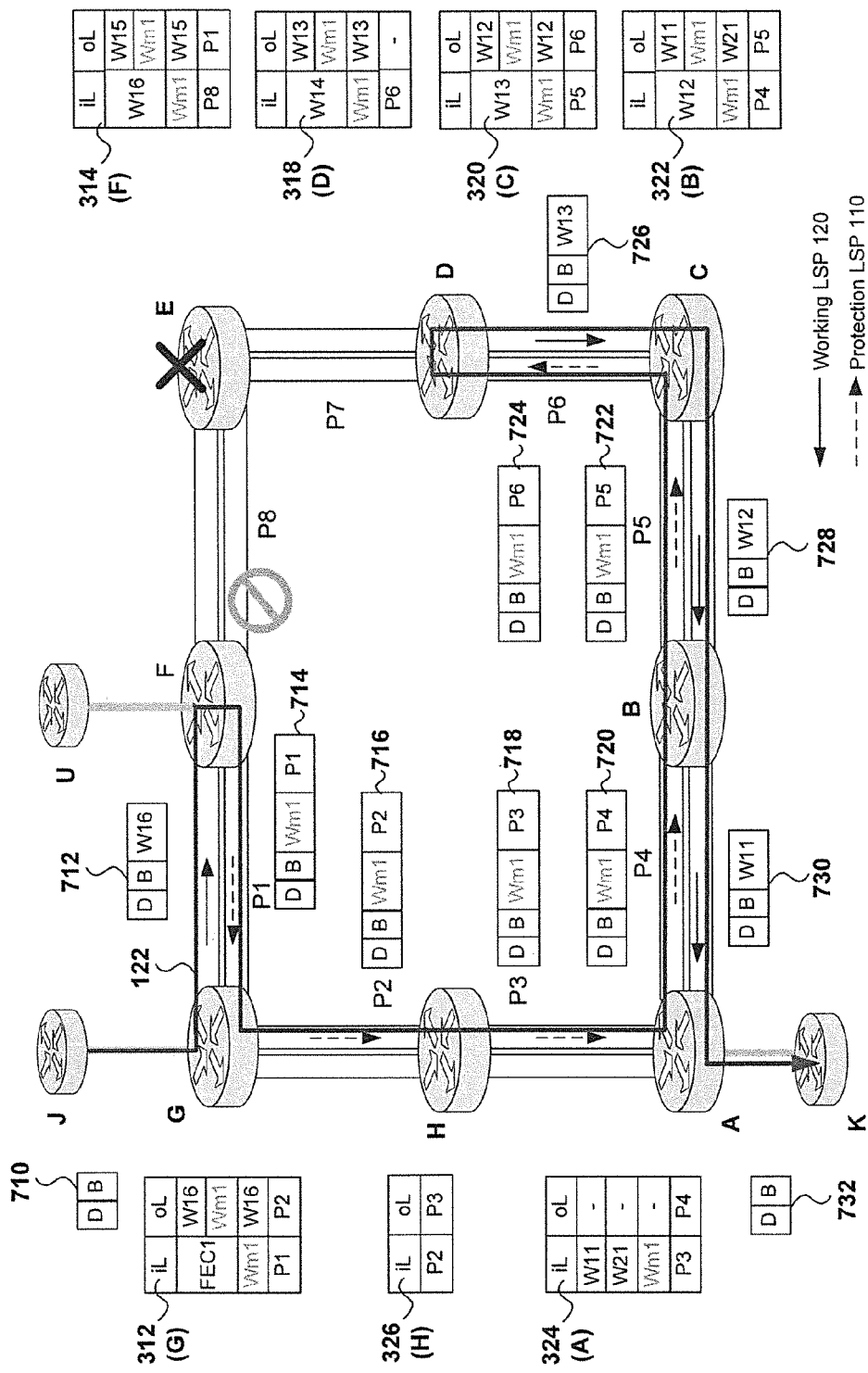
FIG. 7 is an example of packet forwarding on a protection label switch path in the network in FIG. 1 and FIG. 3.

FIG. 7 shows an example of how packets are transmitted in the event of a failure on the working LSP 120 in the network in FIG. 3 according to the example method in FIG. 5 and FIG. 6.

In this case, transit node F ("first node") and node D ("second node") are disconnected from an adjacent node E, which is downstream to node F but upstream from the node D on the working LSP 120.

At node F:
Node F detects that it is not connected to an adjacent node E. In the example shown in FIG. 7, node E is shown to have failed but the disconnection may also be caused by a failure of the link connecting nodes E and F. Node F proceeds to activate protection switching and blocks any packets received on the protection LSP from node E.

At node G:
Ingress node G receives a packet 710 from device J that is intended for transmission to device K. Based on the FEC information 312 of the packet, node G adds a working label [W16] to the packet and forwards the packet 712 to node F on the working LSP 120.

At node F
Node F receives the packet 712, and searches for forwarding information 314 associated with the working label [W16] on the packet. Since protection switching is activated due to disconnection with node E, node F adds a merge label [Wm1] and a protection label [P1] to the packet 714.

At node G:
Node G receives and processes the packet 714 based on its topmost label [P1]. Based on forwarding information 312 associated with protection label [P1], node G swaps the protection label [P1] with protection label [P2] and sends the packet 716 to node H.

At nodes H, A, B and C:
Similar swap operations are performed at nodes H, A, B and C. More specifically, node H replaces [P2] in packet 716 with [P3] based on forwarding information 326. Node A replaces [P3] in packet 718 with [P4] based on forwarding information 324. Node B replaces [P4] in packet 720 with [P5] based on forwarding information 322. Node C replaces [P5] in packet 722 with [P6] based on forwarding information 320.

At node D:
Node D receives the packet 724 with protection label [P6] and merge label [Wm1]. Based on forwarding information 318, node D removes protection label [P6] from the packet 724, and replaces the merge label [Wm1] with a working label [W13]. The packet 726 is then transmitted on the working LSP 120 to a downstream node C.

At nodes C and B:
Node C receives the packet 726 and replaces the working label [W13] with [W12] based on its forwarding information 320. Similarly, node B receives the packet 728 and replaces the working label [W12] with [W11] based on its forwarding information 322.

At node A:
Egress node A receives the packet 730 on the working LSP 120. Based on forwarding information 324, node A removes working label [W11] and forwards the packet 732 to device K.

Figure 8:
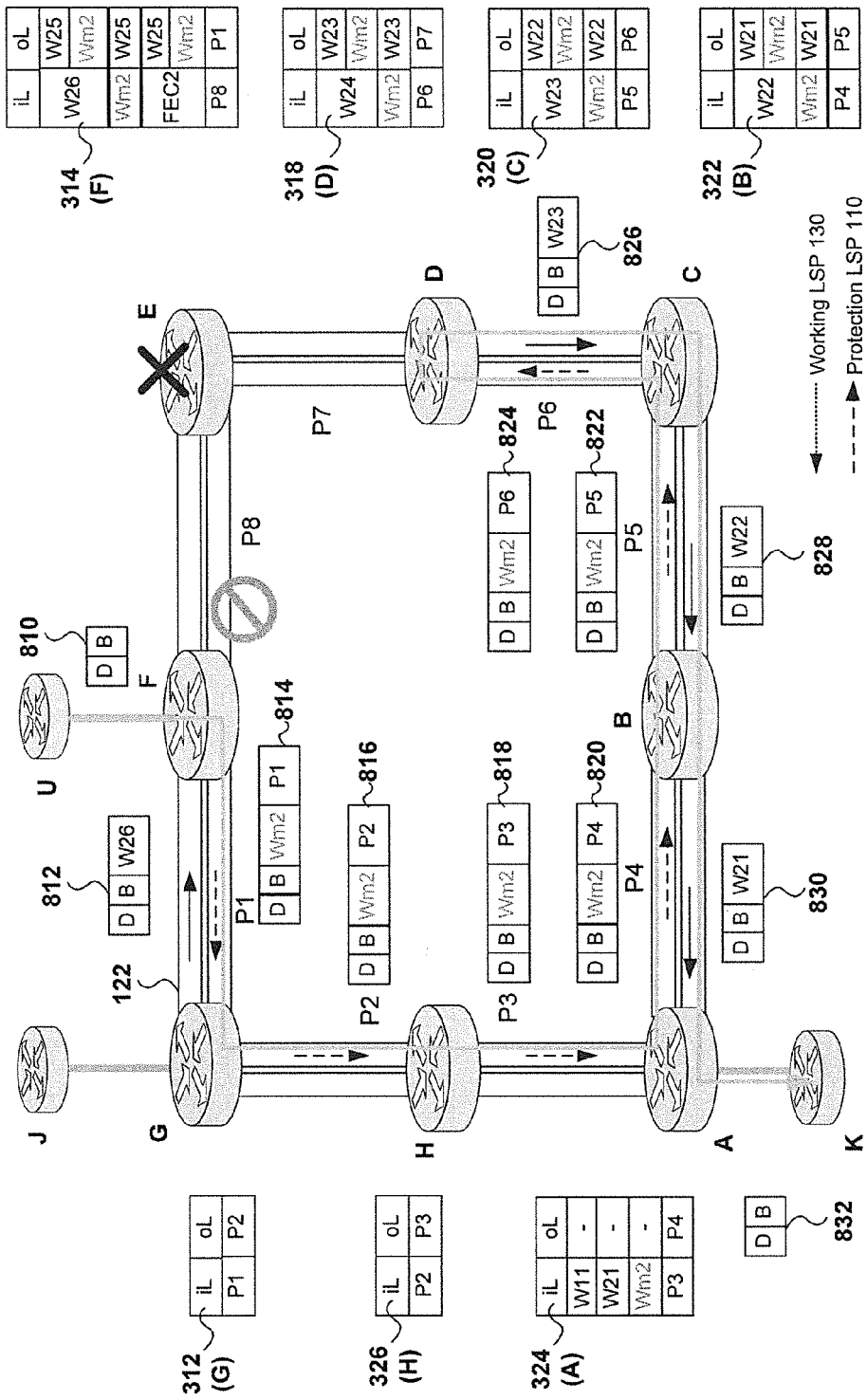
FIG. 8 is another example of packet forwarding on a protection label switch path in the network in FIG. 1 and FIG. 3.

FIG. 8 shows another example of how packets are transmitted in the event of a link or node failure on the working LSP 130 for service connection 132 in the network in FIG. 3 according to the example method in FIG. 5 and FIG. 6. This example illustrates, inter alia, how the protection LSP 110 for working LSP 120 in FIG. 7 is also used for working LSP 130 in FIG. 8.

In this case, ingress node node F ("first node") and node D ("second node") are disconnected from an adjacent node E, which is downstream to node F but upstream from the node D on the working LSP 130.

At node F ("first node"):
Node F detects that it is not connected to an adjacent node E and proceeds to activate protection switching and block any packets received on the protection LSP 110 from node E.

Node F, being also an ingress node, receives a packet 810 with FEC2 from device U that is intended for transmission to device K. Since protection switching is activated, node F adds a merge label [Wm2] and protection label [P1] to the packet 812, which is then sent to a node G downstream to node F on the protection LSP 110.

At node G:
Based on forwarding information 312 associated with protection label [P1], node G swaps the protection label [P1] with protection label [P2] and forwards the packet 816 on.

At nodes H, A, B and C:
Similar swap operations are performed at nodes H, A, B and C. Node H replaces [P2] in packet 816 with [P3] based on forwarding information 326. Node A replaces [P3] in packet 818 with [P4] based on forwarding information 324. Node B replaces [P4] in packet 820 with [P5] based on forwarding information 322. Node C replaces [P5] in packet 822 with [P6] based on forwarding information 320.

At node D ("second node"):
Node D receives the packet 824 with protection label [P6] and merge label [Wm2]. Based on forwarding information 318, node D removes protection label [P6] from the packet 824, and replaces the merge label [Wm2] with a working label [W23]. The packet 826 is then transmitted on the working LSP 120 to a downstream node C.

At nodes C and B:
Node C receives the packet 826 and replaces the working label [W23] with [W22] based on its forwarding information 320. Similarly, node B receives the packet 828 and replaces the working label [W22] with [W21] based on its forwarding information 322.

At node A:

Egress node A receives the packet 730 on the working LSP 120. Based on forwarding information 324, node A removes working label [W21] and forwards the packet 832 to device K.

Figure 9:
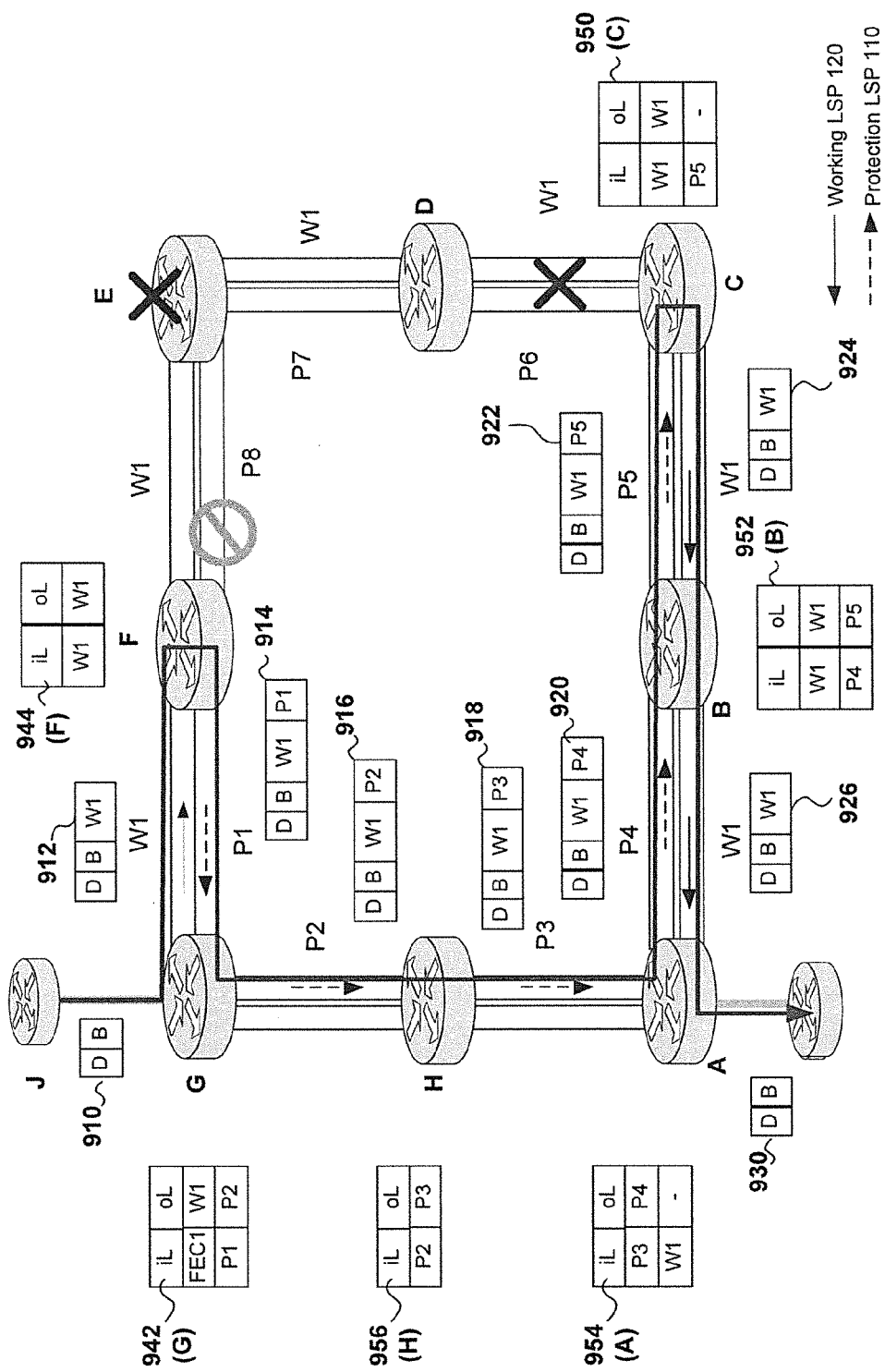
FIG. 9 is an example of packet forwarding in the example in FIG. 7, but with all nodes having the same working label.

In another example in FIG. 9, the same working label [W1] is used by all nodes on the working LSP 120 in FIG. 7. In this case, the working label [W1] also uniquely identifies the working LSP 120 and therefore is also used as a merge label.

In this case, node E and a link between nodes C and D have failed. Node F ("first node") detects that its disconnection from adjacent node E while node C ("second node") detects its disconnection from adjacent node D.

At node F:

Node F detects that it is not connected to an adjacent node E and proceeds to activate protection switching and block any packets received on the protection LSP 110 from node E.

At node G:

Ingress node G receives a packet 910 from device J that is intended for transmission to device K. Based on the FEC information of the packet, node G adds a working label [W1] to the packet and forwards the packet 912 to node F on the working LSP 120.

At node F

Node F receives the packet 912, and searches for forwarding information 944 associated with the working label [W1] on the packet. Since protection switching is activated due to disconnection with node E, node F also adds protection label [P1] to the packet 914.

At node G:

Based on forwarding information 942 associated with protection label [P1], node G swaps the protection label [P1] with [P2].

At nodes H, A and B:

Similar swap operations are performed at nodes H, A, B and C. More specifically, node H replaces [P2] in packet 916 with [P3] based on forwarding information 956. Node A replaces [P3] in packet 918 with [P4] based on forwarding information 954. Node B replaces [P4] in packet 920 with [P5] based on forwarding information 952.

At node C:

Node C receives the packet 922 with protection label [P6] and working label [W1]. Based on forwarding information 950, node C removes protection label [P6] from the packet 922, and replaces the working label [W1] with [W1]. The packet 924 is then transmitted on the working LSP 120 to a downstream node C.

At node B:

Node B receives the packet 924 and replaces the working label [W1] with [W1] based on its forwarding information 952.

At node A:

Egress node A receives the packet 926 on the working LSP 120. Based on forwarding information 954, node A removes working label [W1] and forwards the packet 930 to device K.

Network Device

Figure 10:
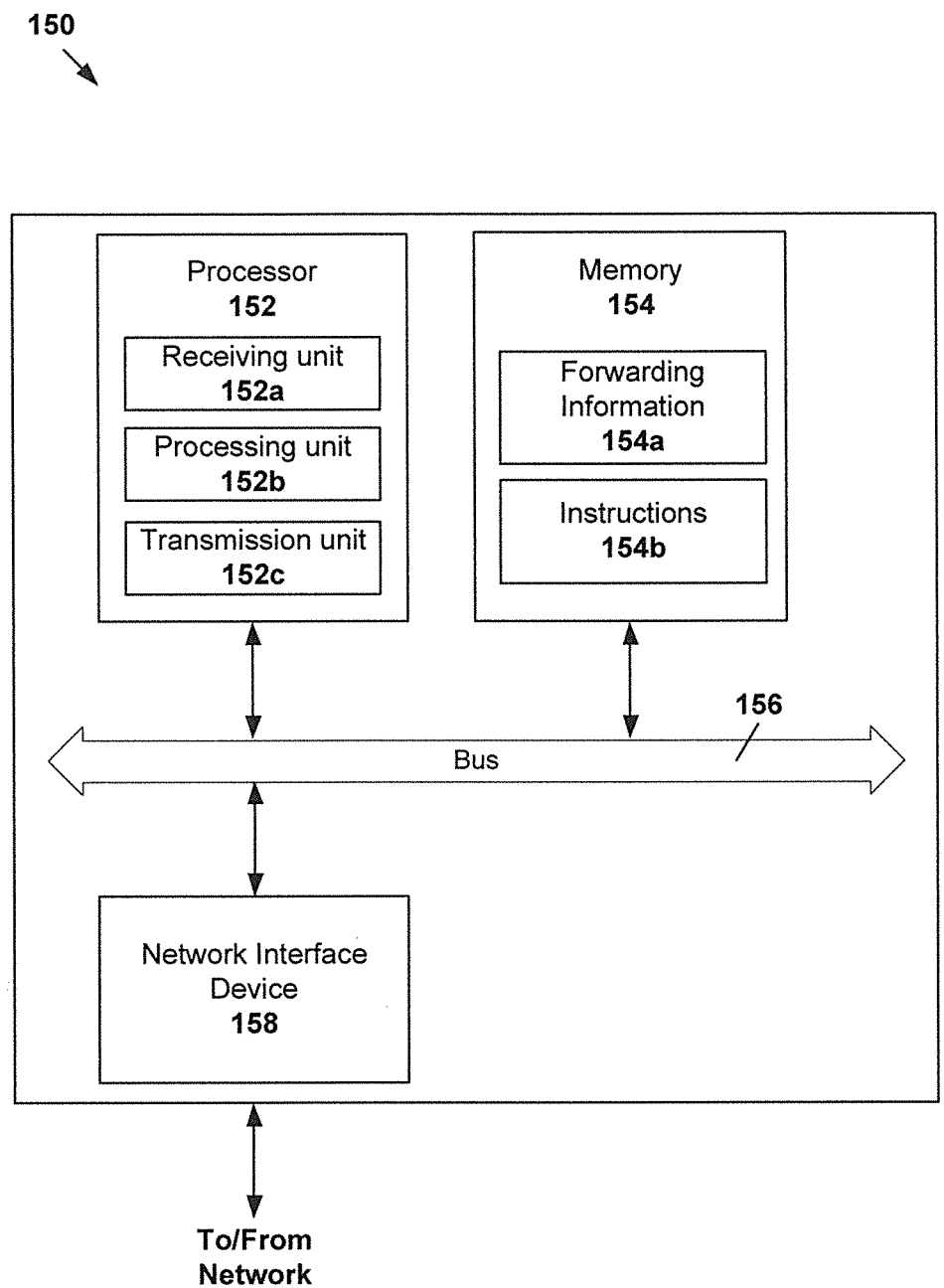
FIG. 10 is a block diagram of an example structure of a network device.

The above examples can be implemented by hardware, software or firmware or a combination thereof. Referring to FIG. 10, an example structure of a network device capable of acting as a node (such as A to H, J, K and U) in the MPLS network 100 is shown. The example network device 150 includes a processor 152, a memory 154 and a network interface device 158 that communicate with each other via bus 156. Forwarding information 154a is stored in the memory 154.

The processor 152 implements functional units in the form of receiving unit 152a, processing unit 152b and transmission unit 152c. Information may be transmitted and received via the network interface device 158, which may include one or more logical or physical ports that connect the network device 150 to another network device.

In case of a network device capable of acting as a "first node":

The receiving unit 152a is to receive, on a working label switch path, a packet intended for transmission towards a disconnected adjacent node on the working label switch path.

The processing unit 152b is to add, to the received packet, a protection label and a merge label based on the forwarding information 154a in the memory 154. The merge label unique identifies the working label switch path on which the packet is received and known to nodes on the working label switch path identified by the merge label.

The transmitting unit 152c is to transmit the packet on the protection label switch path.

In case of a network device capable of acting as a "first node":

The receiving unit 152a is to receive, on a working label switch path, a packet intended for transmission towards a disconnected adjacent node on the working label switch path.

The processing unit 152b is to add, to the received packet, a protection label and a merge label based on the forwarding information 154a in the memory 154. The merge label unique identifies the working label switch path on which the packet is received, and is known to nodes on the working label switch path identified by the merge label.

The transmitting unit 152c to transmit the packet on the protection label switch path.

For example, the various methods, processes and functional units described herein may be implemented by the processor 152. The term 'processor' is to be interpreted broadly to include a CPU, processing unit, ASIC, logic unit, or programmable gate array etc. The processes, methods and functional units may all be performed by a single processor 150 or split between several processors (not shown in FIG. 10 for simplicity); reference in this disclosure or the claims to a 'processor' should thus be interpreted to mean 'one or more processors'.

Although one network interface device 158 is shown in FIG. 10, processes performed by the network interface device 158 may be split between several network interface devices. As such, reference in this disclosure to a 'network interface device' should be interpreted to mean 'one or more network interface devices'.

The processes, methods and functional units, which may include one or more of the receiving unit 152a, the processing unit 152b and the transmission unit 152c, may be implemented as machine-readable instructions 154b executable by one or more processors, hardware logic circuitry of the one or more processors or a combination thereof. In the example in FIG. 10, the machine-readable instructions 154b are stored in the memory 154. One or more of the receiving unit 152a, processing unit 152b and transmission unit 152c may be implemented as hardware or a combination of hardware and software.

Further, the processes, methods and functional units described in this disclosure may be implemented in the form of a computer software product. The computer software product is stored in a storage medium and comprises a plurality of instructions for making a computer device (which can be a personal computer, a server or a network device such as a router, switch, bridge, host, access point etc.) to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It will be appreciated that numerous variations and/or modifications may be made to the processes, methods and functional units as shown in the examples without departing from the scope of the disclosure as broadly described. The examples are, therefore, to be considered in all respects as illustrative and not restrictive.

The invention claimed is:

1. A method for protection switching in a multi-protocol label switching (MPLS) ring network with a protection label switch path that is shared by multiple working label switch paths, the method comprising:
   receiving, on a working label switch path, a packet intended for transmission towards a disconnected adjacent node on the working label switch path;
   adding, to the received packet, a protection label and a merge label in response to determining the received packet is intended for the transmission towards the disconnected adjacent node on the working label switch path, wherein the merge label uniquely identifies the working label switch path on which the packet is received and is known to nodes on the working label switch path identified by the merge label; and
   transmitting the packet on the protection label switch path.

2. The method of claim 1, wherein adding the merge label to the received packet further comprises:
   determining a forwarding equivalence class of the packet;
   determining the merge label from forwarding information that associates the forwarding equivalence class with the merge label and a push label operation; and
   performing a push label operation to add the merge label to the received packet.

3. The method of claim 1, wherein adding the merge label to the received packet further comprises:
   determining a working label of the received packet;
   determining the merge label from forwarding information that associates the working label with the merge label and a swap label operation; and
   performing a swap label operation to replace the working label of the packet with the merge label.

4. The method of claim 3, wherein the merge label is the same as the working label.

5. The method of claim 1, further comprising, prior to receiving the packet,
   detecting disconnection from the adjacent node on the working label switch path; and
   upon the detection, blocking any packet received on the protection label switch path from the adjacent node.

6. The method of claim 5, wherein the disconnection is due to a failure of the adjacent node or a failure of a link leading to the adjacent node.

7. The method of claim 1, comprising:
   assigning a working label, the merge label and the protection label to each node on the working label switch path.

8. A network device for protection switching in a multi-protocol label switching (MPLS) ring network with a protection label switch path shared by multiple working label switch paths, the network device comprising:
   a memory to store forwarding information;
   a receiving unit to receive, on a working label switch path, a packet intended for transmission towards a disconnected adjacent node on the working label switch path;
   a processing unit to add, to the received packet, a protection label and a merge label based on the forwarding information and in response to determining the received packet is intended for the transmission towards the disconnected adjacent node on the working label switch path, wherein the merge label uniquely identifies the working label switch path on which the packet is received and is known to nodes on the working label switch path identified by the merge label; and
   a transmitting unit to transmit the packet on the protection label switch path.

9. The network device of claim 8, wherein a working label, the merge label and the protection label are assigned to each node on the working label switch path.

10. A method for protection switching in a multi-protocol label switching (MPLS) ring network having a protection label switch path shared by multiple working label switch paths, the method comprising:
    receiving, on the protection label switch path, a packet with a protection label and a merge label, wherein the merge label uniquely identifies a working label switch path in the network and is known to nodes on the working label switch path identified by the merge label;
    removing the protection label from the packet and replacing the merge label with a working label, wherein the working label is associated with the working label switch path uniquely identified by the merge label; and
    transmitting the packet on the working label switch path.

11. The method of claim 10, wherein replacing the merge label with the working label further comprises:
    determining the working label from forwarding information that associates the merge label with the working label and a swap label operation; and
    performing a swap label operation to replace the merge label with the working label.

12. The method of claim 10, wherein the merge label is the same as the working label, and the working label is also used by other network devices in the network.

13. The method of claim 10, further comprising:
    detecting disconnection from the adjacent on the working label switch path; and
    upon the detection, updating forwarding information to associate the protection label of the packet with a pop operation.

14. The method of claim 13, wherein the disconnection is due to a failure of the adjacent node or a failure of a link leading to the adjacent node.

15. The method of claim 10, comprising:
assigning a working label, the merge label and the protection label to each node on the working label switch path.

16. A network device for protection switching in a multi-protocol label switching (MPLS) ring network having a protection label switch path shared by multiple working label switch paths, the network device comprising:
a memory to store forwarding information;
a receiving unit to receive, on the protection label switch path, a packet with a protection label and a merge label, wherein the merge label uniquely identifies a working label switch path in the network and is known to nodes on the working label switch path identified by the merge label;
a processing unit to remove the protection label from the packet and replace the merge label with a working label based on the forwarding information, wherein the working label is associated with the working label switch path identified by the merge label; and
a transmitting unit to transmit the packet on the working label switch path.

17. The network device of claim 16, wherein a working label, the merge label and the protection label are assigned to each node on the working label switch path.

\* \* \* \* \*